United States Patent [19]

Tolley

[11] 4,175,952
[45] Nov. 27, 1979

[54] RECOVERY OF IRON AND TITANIUM METAL VALUES

[75] Inventor: William K. Tolley, Arlington Heights, Ill.

[73] Assignee: UOP Inc., Des Plaines, Ill.

[21] Appl. No.: 925,902

[22] Filed: Jul. 19, 1978

[51] Int. Cl.² ............................ C21B 15/00; C01G 23/04
[52] U.S. Cl. .................................. 75/101 R; 75/1 T;
75/114; 423/82; 423/83; 423/85; 423/86;
423/140; 423/150
[58] Field of Search .................... 423/82, 83, 85, 86;
75/108, 114, 1 T, 101 R

[56] References Cited

U.S. PATENT DOCUMENTS

| | | | |
|---|---|---|---|
| 2,088,913 | 8/1937 | Llewellyn | 423/86 |
| 3,076,692 | 2/1963 | Ruter et al. | 423/83 |
| 3,236,596 | 2/1966 | Zungill et al. | 423/83 |
| 3,407,033 | 10/1968 | Ruter et al. | 423/83 |
| 3,529,931 | 9/1970 | Moklebust | 423/86 |
| 3,825,419 | 7/1974 | Chen | 75/101 R |
| 3,859,077 | 1/1975 | Othmer | 75/1 T |
| 3,903,239 | 9/1975 | Berkovich | 423/82 |
| 3,929,962 | 12/1975 | Shiah | 423/83 |

FOREIGN PATENT DOCUMENTS 582579 9/1959 Canada .................................. 423/82

*Primary Examiner*—Herbert T. Carter
*Attorney, Agent, or Firm*—James R. Hoatson, Jr.; Raymond H. Nelson; William H. Page, II

[57] ABSTRACT

Iron metal values and titanium metal values may be recovered from iron and titanium bearing sources such as an ilmenite ore by subjecting the source to a reductive roast after crushing the source to a desired particle size. The reduced source is then leached by treatment with a halogen-containing compound to form soluble titanium halides and iron halides. Thereafter the soluble titanium halide is precipitated by treatment with iron oxides such as ferric oxide and after separation from the soluble iron halides is recovered as titanium dioxide. The soluble iron halides are then crystallized by reducing the temperature of the solution and one portion of the crystals are subjected to a reduction step to form metallic iron. The other portion of the iron halide crystals is oxidized to form ferric oxide which is used to precipitate the titanium compound.

9 Claims, 1 Drawing Figure

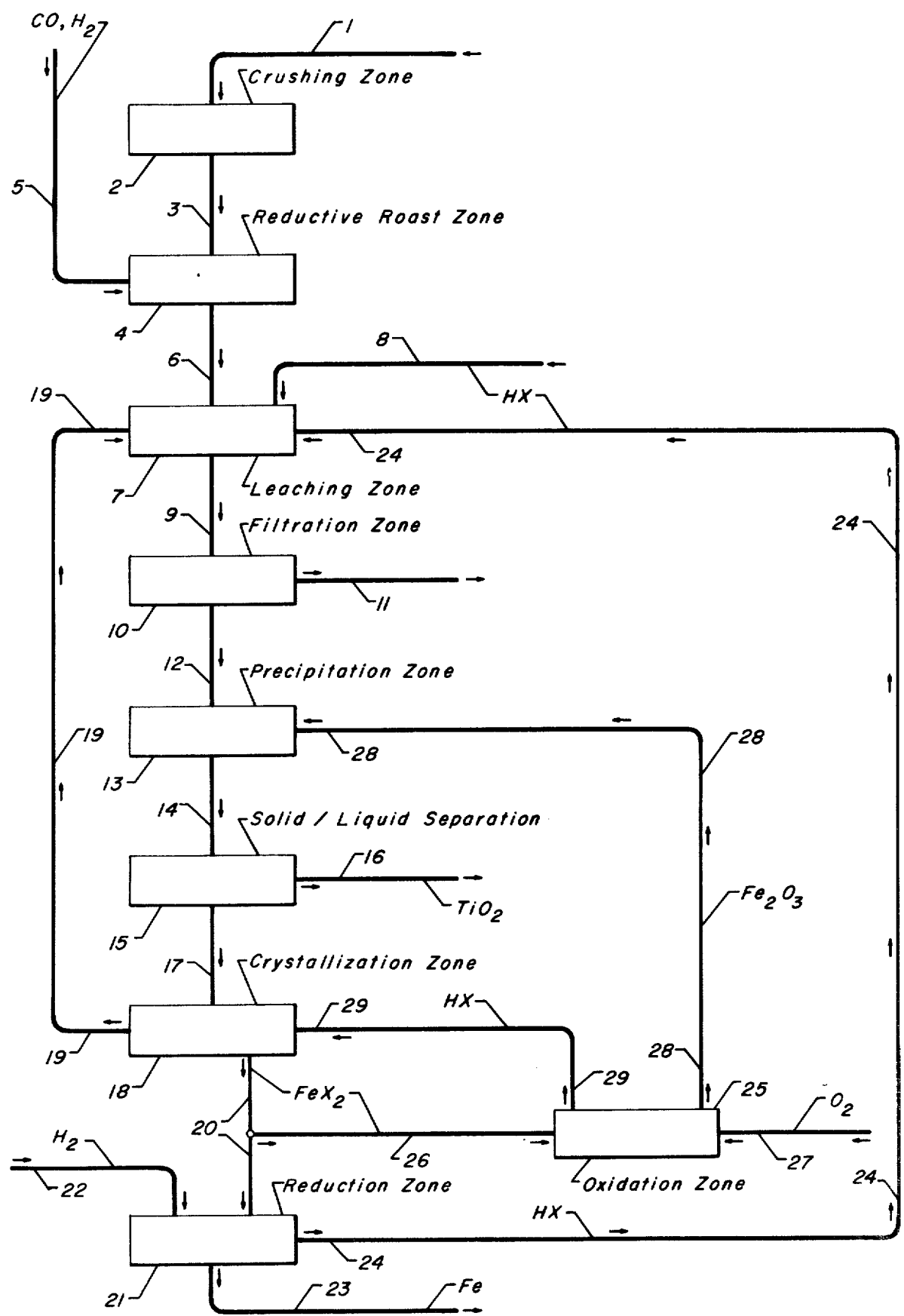

RECOVERY OF IRON AND TITANIUM METAL VALUES

BACKGROUND OF THE INVENTION

Titanium in metallic form or as a compound is an important element in the chemical series. For example, titanium dioxide is utilized in paint pigments, in white rubbers and plastics, floor coverings, glassware and ceramics, painting inks, as an opacifying agent in papers, etc. The other titanium compounds are used in electronics, as fire retardants, waterproofing agents, etc. The metal may be used as such or in alloy form as structural material in aircraft, in jet engines, marine equipment, textile machinery, surgical instruments, orthopedic appliances, sporting equipment, food handling equipment, etc. Heretofore in recovering the titanium from titanium bearing sources such as ilmenite, rutile, etc., the titanium has been subjected to separation steps which involve the formation of titanium as a compound in a valence state of +4, such compounds usually involving titanium oxide. However, when attempting to separate titanium dioxide from impurities which are also contained in the ore such as iron, the hydrolysis of the titanium dioxide at elevated temperatures usually results in also obtaining relatively large amounts of iron along with the titanium.

Heretofore in the prior art various methods have been utilized to recover titanium values from titanium bearing sources. For example, in U.S. Pat. No. 3,236,596 an unroasted ilmenite ore is leached with hydrogen chloride at an elevated temperature. Following this, dissolved iron is reduced with iron or other reductants to precipitate ferrous chloride by saturating the liquor with hydrogen chloride gas. The hydrogen chloride is then extracted from the liquor by a vacuum distillation and the titanium is recovered by conventional means. Likewise, U.S. Pat. No. 3,825,419 reduces an ilmenite ore to produce ferrous oxides. The reduced ore is then leached for about 4 hours under a moderate pressure thereby dissolving the iron in the acid along with about 15% of the titanium. The iron is recovered as ferric oxide containing impurities in the spray roaster while the insoluble product which is primarily titanium dioxide but which contains all of the silica present in the original ore is recovered. U.S. Pat. No. 3,859,077 also discloses a process for recovering titanium in which a titanium tetrahalide is mixed with iron oxide in slag or a titaniferous ore at an extremely high temperature of about 1000° C. to produce volatile impurity chlorides and titanium dioxide. A similar patent, U.S. Pat. No. 3,929,962, also reduces a titanium bearing ore at a high temperature to produce titanium sesquioxide which is in a form whereby it is easier to treat for a titanium-iron separation. Another prior art reference, U.S. Pat. No. 3,903,239 teaches a method for recovering titanium in which unroasted ilmenite is leached over a period of days at room temperature to recover about 80% of the titanium. Sulfur dioxide is added during the leaching to cause a precipitation of the ferrous chloride after which titanium dioxide is recovered by diluting and heating the solution.

In contradistinction to the prior art methods hereinbefore set forth for recovering titanium values from a titanium bearing source, it has now been found possible to recover the iron which is present in the source as well as recovering the titanium metal values.

This invention relates to a process for obtaining both iron metal values and titanium metal values from a bearing source which contains both iron and titanium. More specifically, the invention is concerned with a process for recovering titanium metal values and iron metal values from a titanium bearing source such as ilmenite. The advantages of utilizing the process of the present invention are found in the fact that the reactions may, if so desired, be effected at atmospheric pressure, thus obviating the use of relatively expensive and complicated equipment as well as obtaining a desired yield of titanium metal values using relatively low grade ores as a starting material. Another advantage lies in the additional recovery of iron metal values from the ore in contradistinction to other processes where such values have been lost and not recovered.

It is therefore an object of this invention to provide an improved process for the production of iron metal values and titanium metal values.

A further object of this invention is to provide a hydrometallurgical process for obtaining high yields of titanium metal values as well as recovery of iron metal values from bearing sources containing both metals.

In one aspect an embodiment of this invention resides in a process for the recovery of iron values and titanium values from an iron and titanium bearing source which comprises the steps of crushing said source, subjecting said crushed source to a reductive roast at an elevated temperature in a reducing atmosphere, leaching the resultant reduced source with a leach solution comprising a halogen-containing compound, separating insoluble gangue from the soluble metal halides, precipitating titanium dioxide from the soluble metal halides by treatment with iron oxides, separating said titanium dioxide from soluble iron halide and recovering said titanium dioxide, crystallizing the soluble iron halide in a crystallization zone, reducing one portion of said iron halide to form metallic iron and recovering the same, oxidizing the second portion of said iron halide to form iron oxides, and recycling said iron oxides to precipitate titanium dioxide.

A specific embodiment of this invention is found in a process for the recovery of iron values and titanium values from ilmenite which comprises the steps of crushing ilmenite, subjecting said crushed ilmenite to a reductive roast at a temperature in a range of from about 600° to about 900° C. in a reducing atmosphere, leaching the resultant reduced ilmenite with a leach solution comprising hydrogen chloride to form soluble iron chloride and soluble titanium chloride, filtering to remove the insoluble gangue, precipitating titanium dioxide from the soluble titanium chloride by treatment with ferric oxide, separating the solid titanium dioxide from soluble iron chlorides, crystallizing soluble iron chloride in a crystallization zone at a reduced temperature, reducing one portion of the iron chloride at a temperature in the range of 600° to about 900° C. to form metallic iron and hydrogen chloride, recycling the hydrogen chloride thus formed to the leach zone for use as a portion of the leach solution, oxidizing the second portion of the iron chloride to form ferric oxide and recycling the thus formed ferric oxide to contact with titanium chloride to form solid titanium dioxide.

Other objects and embodiments will be found in the following further detailed description of the present invention.

As hereinbefore set forth, the present invention is concerned with a process for recovering both iron metal values and titanium metal values from a metal bearing source such as ore including ilmenite, rutile, etc. By utilizing the process of the present invention, it is possible to obtain a high yield of titanium metal values while also maintaining iron metal values which heretofore have not been recovered as such. The process is effected by crushing an ore source such as ilmenite or other sources such as sand which contains the desired metals, chiefly titanium and iron as well as minor amounts of vanadium, chromium, manganese, etc., to a particle size less than about 35 mesh. Thereafter, the crushed metal bearing source is subjected to a reductive roast at an elevated temperature which will range from about 600° up to about 1000° C. or more and preferably in a range of from about 600° to about 900° C. in the presence of a reducing gas such as hydrogen, carbon monoxide, combinations of carbon monoxide and hydrogen, etc., or any other suitable reductant. The reductive roast is effected for a period of time ranging from about 0.5 up to about 2 hours or more. In the preferred embodiment of the invention, the reducing atmosphere which is used to accomplish the purpose of the roast usually comprises a mixture of about 50% carbon monoxide and 50% hydrogen, with an excess of reductant being utilized in order to completely reduce the iron which is present in the system to the metal. It is also contemplated within the scope of this invention that the crushed ore may be, if so desired, subjected to an oxidation roast prior to the reductive roast, said oxidative roast being accomplished at a temperature in the range of from about 600° to about 900° C. in the presence of an oxidizing atmosphere which is provided for by the presence of air or oxygen. However, it is to be understood that this step is not a necessary part of the present invention. Following the reductive roast of the metal bearing source, the source is then subjected to an aqueous hydrogen halide leach which, in the preferred embodiment of the invention, comprises an aqueous hydrogen chloride leach although other hydrogen halides such as hydrogen bromide and hydrogen iodide may also be utilized although not necessarily with equivalent results. The aforesaid leach of the metal bearing source is usually effected at a temperature which may range from about ambient up to about 110° C., the preferred range being from about 80° to about 100° C., for a period of time ranging from about 0.25 hours up to about 1 hour or more in duration.

Following the leach of the metal bearing source which will form soluble iron halides and titanium such as ferrous chloride, titanium trichloride, etc., the mixture is subjected to a separation step in which the solid gangue is separated from the soluble metal chlorides and discarded. The separation of the solid gangue from the soluble metal chlorides may be effected in any suitable manner by means well known in the art, said means including decantation, filtration, etc. The soluble metal halides are then subjected to a precipitation step in a precipitation zone wherein the aqueous metal halides such as titanium trichloride and ferrous chloride are subjected to reaction with an iron oxide, preferably one in which the iron is present in its highest valence state such as ferric oxide. In this precipitation zone where the treatment is effected at temperatures ranging from about 80° to 110° C., the iron oxide such as ferric oxide will react with titanium chlorides such as titanium trichloride to form solid titanium dioxide. This compound, after separation from the soluble iron halides in a solid/liquid separation zone, will be recovered as such and may thereafter be treated to recover titanium as the metal, if so desired. Following separation of the solid titanium dioxide from the soluble ferrous chloride, the latter is passed to a crystallization zone wherein the temperature is reduced to afford crystallization of the ferrous chloride. For example, the temperature at which the crystallization or precipitation of the ferrous chloride is effected may range from about 0° to slightly in excess of ambient or, in extreme cases, up to about 90° C. When utilizing subambient temperatures the cooled solution is maintained in the desired subambient range by external means such as an ice bath, cooling coils, etc. After crystallization of the ferrous chloride is completed, the solids are separated from the latch liquor which may be recycled back to the leach zone. The solid ferrous chloride is recovered and a major portion of the product is subjected to a direct reduction step which is effected at an elevated temperature in the range of from about 600° to about 900° C. in contact with an excess of hydrogen. In this direct reduction step, the metallic iron which is produced will be in the form of powder or crystals and may be recovered as such. In addition, the hydrogen chloride which is formed during the direct reduction of the ferric chloride to metallic iron is withdrawn and recycled to the leach step of the process to make up a portion of the leach solution. While a major portion of the ferrous chloride in an amount ranging from 50% to 90% is subjected to this direct reduction, the remaining portion in an amount ranging from about 10% to about 50% is subjected to an oxidation step. In the oxidation step the ferrous chloride is treated at an elevated temperature ranging from about 300° to about 800° C. by contact with an oxygen-containing gas such as air or oxygen, the preferred oxidizing agent comprising air due to its greater availability and negligible cost. As in the case of the direct reduction any hydrogen chloride which may be formed during the oxidation step is recycled to the ferrous chloride crystallization zone to saturate said zone in order to insure a complete precipitation of the ferrous chloride by reducing the solubility of said compound. In the oxidation zone the reaction of the ferrous chloride with an oxidizing agent results in the formation of iron oxides such as ferrous oxide, ferric oxide, these compounds being charged to the zone containing the titanium chloride wherein said titanium chloride, which is predominantly titanium trichloride, is contacted with the iron oxides to form titanium dioxide.

BRIEF DESCRIPTION OF THE DRAWING

The present invention will be further illustrated with reference to the accompanying drawing which sets forth a flow diagram of the process of this invention. It is to be understood that various valves, pumps, heat transfer means, etc., have been eliminated as not being essential to the complete understanding of the invention. However, the utilization of these as well as other similar appurtenances, will become obvious as the drawing is described.

A titanium and iron bearing source such as ilmenite ore is charged through line 1 to crushing zone 2. In crushing zone 2 the ilmenite is crushed to the desired particle size which may be less than 35 mesh. After reaching the desired particle size the crushed ore is withdrawn through line 3 and passed to a reductive roast zone 4. In reductive roast zone 4, the crushed ore is contacted with a reductant such as a mixture of carbon monoxide and hydrogen which is passed to zone 4 through line 5. After undergoing the reductive roast for a predetermined period of time in the presence of an excess of the reductant, the reduced source is withdrawn through line 6 and passed to leaching zone 7. As was hereinbefore set forth, it is also contemplated within the scope of this invention that the crushed ore may be subjected to an oxidation step in an oxidation zone not shown in the drawing prior to being subjected to the reductive roast. However, this step is discretionary in nature and may be omitted, if so desired. In leaching zone 7 the reduced ore is leached in contact with an aqueous hydrogen halide and preferably a hydrogen chloride leach solution which is passed into zone 7 through line 8. After being leached at a temperature which may range from ambient to about 110° C. for a predetermined period of time, the leach solution is withdrawn from zone 7 through line 9 and passed to filtration zone 10. In this zone the solid gangue as well as insoluble metal compounds are separated from the soluble metal halides and withdrawn through line 11 for disposal or, if so desired, recovery of other metals which may have been present in the ore and which have remained insoluble during the leaching step of the process. The soluble metal halides including the iron halides and titanium halides are withdrawn from filtration zone 10 through line 12 and passed to precipitation zone 13.

In precipitation zone 13 the soluble metal halides such as ferrous chloride and titanium trichloride are contacted with iron oxides and preferably ferric oxides at temperatures ranging from about 80° to about 110° C. After formation and precipitation of titanium dioxide by treatment with the aforesaid ferric oxide the solution is withdrawn from precipitation zone 13 through line 14 and passed to a solid/liquid separation zone 15. The separation of the solid titanium dichloride from the leach liquor which contains a soluble ferrous chloride may be accomplished by any means known in the art such as filtration, centrifugation, decantation, etc. The solid titanium dioxide being withdrawn from separation zone 15 through line 16 and passed to storage as such or, if so desired, to further treatment for obtaining titanium metal.

The leach liquor containing the soluble ferrous chloride is withdrawn from separation zone 15 through line 17 and passed to crystallization zone 18. In zone 18 the ferrous chloride is crystallized due to a temperature drop which is effected by maintaining crystallization zone 18 at a temperature lower than that found in the previous source and within a range hereinbefore set forth. After crystallization of the ferrous chloride the spent leach liquor may be withdrawn through line 19 for recycle to leaching zone 7. The solid ferrous chloride is withdrawn from crystallization zone 18 through line 20 and a major portion of the solid, that is, from about 50% to about 90% is passed to reduction zone 21. In reduction zone 21, the solid ferrous chloride is subjected to a direct reduction by treatment at an elevated temperature within the range hereinbefore set forth, that is, from about 600° to about 900° C. in contact with an excess of hydrogen which is charged to reduction zone 21 through line 22. The metallic iron which is formed during the reduction step of the process is withdrawn from zone 21 through line 23 and passed to storage in either powder or crystalline form. During the reduction of the ferrous chloride, hydrogen chloride which is formed is also withdrawn from reduction zone 21 through line 24 and recycled to leaching zone 7 to form a portion of the leach solution. The minor portion of the ferrous chloride which has been withdrawn from crystallization zone 18 is passed to oxidation zone 25 through line 26. In oxidation zone 25 the oxidation of ferrous chloride is effected at temperatures ranging from about 300° to about 800° C. by treatment with an oxygen-containing gas which is charged to oxidation zone 25 through line 27. In oxidation zone 19 the ferrous chloride is oxidized to iron oxides such as ferrous oxide and ferric oxide which are withdrawn from zone 25 through line 28 and passed to precipitation zone 13 for use in the treatment of titanium chlorides to form the desired titanium dioxide. Any hydrogen chloride which is formed in oxidation zone 25 is withdrawn therefrom and recycled back to crystallization zone 18 through line 29. By recycling the hydrogen chloride to crystallization zone 18 the solubility of the ferrous chloride in zone 18 will be lessened due to the saturation which is effected by the presence of the excess hydrogen chloride.

While the aforesaid description is indicative of a batch type operation, it is also contemplated within the scope of this invention to effect the process utilizing a continuous method of operation. This type of operation is effected by continuously feeding the ore which has been crushed in the crushing zone to a reducing roast zone wherein the ore is subjected to a reductive roast utilizing a reductant comprising either hydrogen, carbon monoxide, or a combination thereof which is also continuously charged to this zone. After passage through the zone for a predetermined period of time, the reduced charge is continuously withdrawn and passed to a leaching zone wherein it is subjected to leach treatment with a hydrogen halide such as an aqueous hydrogen chloride solution. After passage through the leaching zone the pregnant leach liquor containing dissolved metal chlorides along with undissolved solids such as gangue, or insoluble metal halides is continuously withdrawn and passed to a filtration zone wherein the soluble metal halides are separated from the solids. After passage through the filtration zone the pregnant leach liquor is continuously passed to a precipitation zone wherein the leach liquor is contacted with ferric oxide to effect a precipitation of titanium dioxide. The mixture of solid titanium dioxide and leach liquor containing soluble ferrous chloride is continuously withdrawn after passage through the zone to a solid/liquid separation zone wherein the solid titanium dioxide is separated and continuously withdrawn from the leach liquor and passed to storage. The leach liquor is continuously withdrawn from the separation zone and passed to a crystallization zone which is maintained at a lower temperature than that of the previous zones. In the crystallization zone the ferrous chloride crystallizes out of the leach liquor which is continuously withdrawn and recycled to the leach zone. The solid ferrous chloride in crystalline form is continuously withdrawn from this zone and a major portion of the ferrous chloride is passed to a reduction zone wherein it undergoes a direct reduction in the presence of hydrogen to form metallic iron. The metallic iron which is formed in the reduction zone is continuously withdrawn and passed to storage while the hydrogen chloride which is formed during the reduction is also continuously withdrawn and recycled to the leaching zone to form a portion of the leach solution. A minor portion of the ferrous chloride which has been withdrawn from the crystallization zone is passed to an oxidation zone wherein it is contacted with an oxygen-containing gas at an elevated temperature of from about 300° to about 800° C. The contact of the ferrous chloride with oxygen results in the formation of ferrous oxide and ferric oxide, these compounds being continuously withdrawn from the oxidation zone and passed to the precipitation zone hereinbefore set forth for contact with the pregnant leach liquor to effect the formation of solid titanium dioxide. Any hydrogen chloride which is formed during the reaction in the oxidation zone is also continuously withdrawn and passed to the crystallization zone wherein it is used to saturate the zone to reduce the solubility of the ferrous chloride contained therein.

The following examples are given for purposes of illustrating the process of this invention. However, it is to be understood that said examples are given merely for purposes of illustration and that the present process is not necessarily thereto.

EXAMPLE I

An ilmenite ore may be crushed to −100 mesh and thereafter heated to a temperature of about 750° C. under nitrogen in a rotating quartz furnace tube. Thereafter the ore may be reduced by being subjected to a flow of a mixture of hydrogen and carbon monoxide gas which may be passed through the tube at a rate of about 650 cm³/min. for each 100 grams of ore for a period of 1 hour while maintaining the temperature of the tube at about 750° C. At the end of this one hour period the tube and contents thereof may be cooled under nitrogen to room temperature. Following this 50 grams of the reduced ilmenite was mixed with 300 cc of hydrochloric acid and heated to a temperature of 100° C. The reaction was maintained at this temperature for a period of 15 minutes following which the solution was filtered. The soluble portion of the solution was analyzed and found to contain 68 grams/liter of iron, 44.5 grams/liter of titanium and 0.36 grams/liter of vanadium. Following this 100 ml of the solution was heated to a temperature of 100° C. and 2.5 grams of a rutile seed material and 11.6 grams of ferric oxide were added, the temperature of the solution after adding the solids being 108° C. The solution was allowed to react for a period of 5 minutes and thereafter was filtered. The solids which had precipitated during the 5 minute period were washed and dried. The solids which amounted to 6.83 grams of titanium dioxide were recovered.

The liquid portion of the solution was cooled to room temperature resulting in the formation of solid ferrous chloride crystals in an amount of 7.12 grams. The ferrous chloride crystals thus obtained may be dried at a temperature of about 110° C. in an air atmosphere, ground to −35 mesh and placed in a quartz tube, said quartz tube containing steel wool as a support to prevent the iron from nucleating on the tube during the resultant reduction. Thereafter the tube may be heated slowly to a temperature of 800° C. under flowing hydrogen and may be maintained at this temperature for a period of 3 hours. At the end of this time heating may be discontinued and the iron which may be formed will be recovered in the form of a powder.

A second portion of the ferrous chloride crystals may be washed with acetone and dried at a temperature of 400° C. in a fluid bed reactor. Following this the crystals may be roasted at a temperature of about 800° C. using dry air as the fluidizing gas to form the desired ferric oxide.

EXAMPLE II

In a manner similar to that set forth in Example I above, an ilmenite ore may be crushed to −100 mesh and thereafter heated to a temperature of 750° C. under a nitrogen blanket. The reduction of the crushed ore may be effected by treating said ore for a period of 1 hour at a temperature of 750° C. using a mixture of hydrogen and carbon monoxide as the reducing atmosphere. Upon completion of the reduction of the ore the ilmenite may be admixed with concentrated hydrochloric acid and heated to a temperature of 100° C. for a period of 15 minutes to effect a leach of the ore with the formation of soluble ferrous chloride and soluble titanium trichloride. Following the leach of the ore, it may then be filtered to remove insoluble gangue as well as other insoluble metal components. Thereafter the liquid portion may be treated by the addition of ferric oxide while heating the temperature to about 100° C. to effect a precipitation of solid titanium dioxide. The solid titanium dioxide may be separated from the leach liquor containing soluble ferrous chloride by filtration means and the liquid portion of the solution may then be cooled by means of an ice bath to a temperature of 5° C. while bubbling hydrogen chloride gas through the solution. The ferrous chloride crystals which may precipitate out of the cooled solution may be separated from the barren leach liquor and recovered.

One portion of the ferrous chloride crystals may then be roasted in a quartz tube at a temperature of 800° C. for a period of 4 hours under an excess of hydrogen. The resultant metallic iron which may result from the reduction period may be recovered while the hydrogen chloride which is formed during the reduction may be recycled back to the leach solution for use as a portion of the feed solution.

The other portion of the ferrous chloride crystals may be dried at a temperature of about 400° C. and thereafter roasted at a temperature of about 800° C. under an air atmosphere. The ferric oxide which may be produced by the oxidation may then be used to treat the soluble titanium chlorides while any hydrogen chloride which may be produced during the aforesaid oxidation reaction may be recycled to the crystallization zone for use as a saturating agent in the precipitation of the ferrous chloride.

I claim as my invention:

1. A process for the recovery of iron values and titanium values from ilmenite which comprises the steps of:
   (a) crushing said ilmenite;
   (b) subjecting said crushed ilmenite to a reductive roast at a temperature of from about 600° to about 1000° C. in the presence of hydrogen, carbon monoxide, or a mixture of carbon monoxide and hydrogen;
   (c) leaching the resultant reduced ilmenite with a leach solution comprising hydrogen chloride;
   (d) separating insoluble gangue from the soluble metal chlorides;
   (e) precipitating titanium dioxide from the soluble metal chlorides by treatment with ferric oxide;
   (f) separating said titanium dioxide from soluble iron chloride and recovering said titanium dioxide;
   (g) reducing the temperature of the soluble iron chloride sufficiently to crystallize the iron chloride;
   (h) reducing a major portion of said iron chloride to form metallic iron and hydrogen chloride and recovering the metallic iron;

(i) oxidizing the other portion of said iron chloride to form ferric oxide; and
(j) recycling said ferric oxide to step (e) of the process.

2. The process as set forth in claim 1 in which said reductive roast of said ilmenite is effected at a temperature in the range of from about 600° to about 900° C.

3. The process as set forth in claim 1 in which the precipitation of said titanium dioxide is effected at a temperature in the range of from about 80° to about 110° C.

4. The process as set forth in claim 1 in which said iron chloride is crystallized at a temperature in the range of from about 0° to about 90° C.

5. The process as set forth in claim 1 in which the reduction of said iron chloride is effected at a temperature in the range of from about 600° to about 900° C.

6. The process as set forth in claim 1 in which said hydrogen chloride formed by the reduction of said iron chloride is recycled to the leaching step for use as a portion of said leach solution.

7. The process as set forth in claim 1 in which the oxidation of said iron chloride is effected by treatment with an oxygen-containing gas at a temperature in the range of from about 300° to about 800° C.

8. The process as set forth in claim 7 in which the hydrogen chloride formed during the oxidation of said iron chloride is recycled to said crystallization step.

9. The process as set forth in claim 1 in which said crushed ilmenite is subjected to an oxidation step by treatment with an oxygen-containing gas at a temperature in the range of from about 600° to about 900° C. prior to subjecting said ilmenite to a reductive roast.

* * * * *